INVENTOR
ROLF HEINZMANN
ALBERT STIERINGER
BY
Michael S. Stuiter
their ATTORNEY

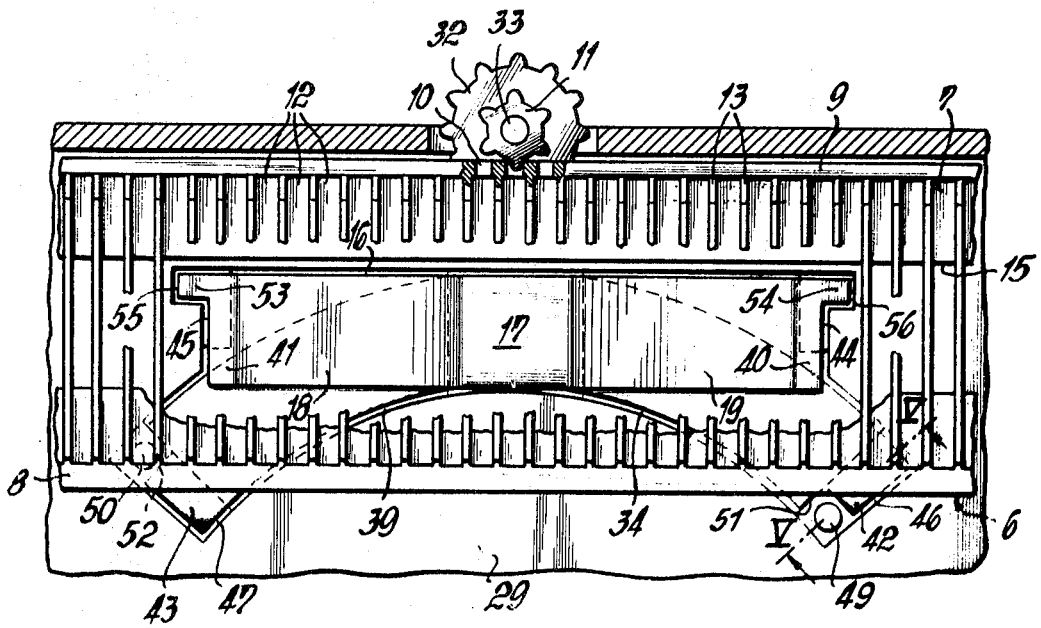
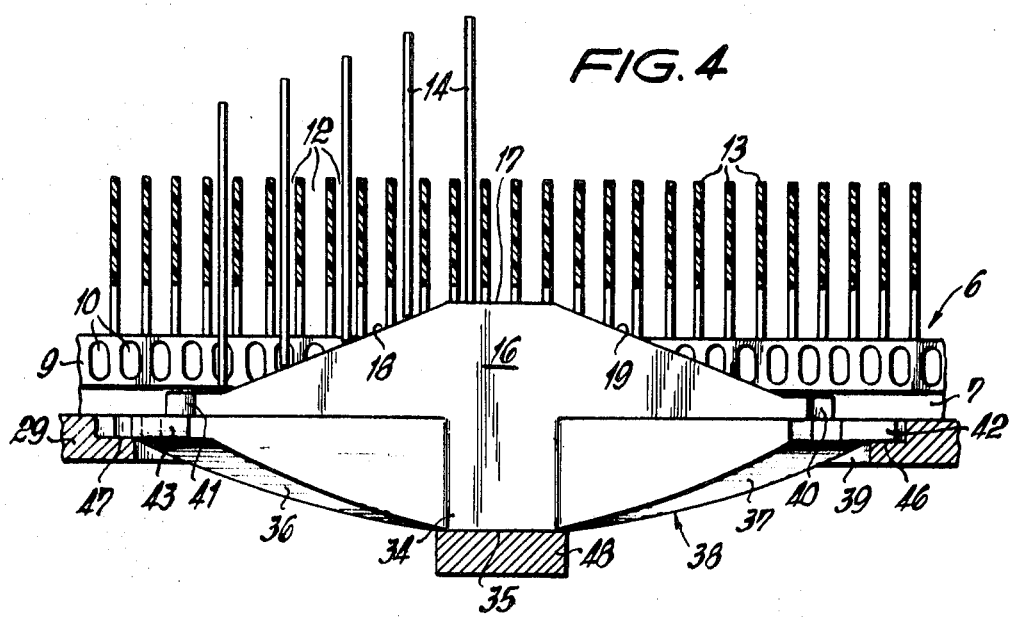

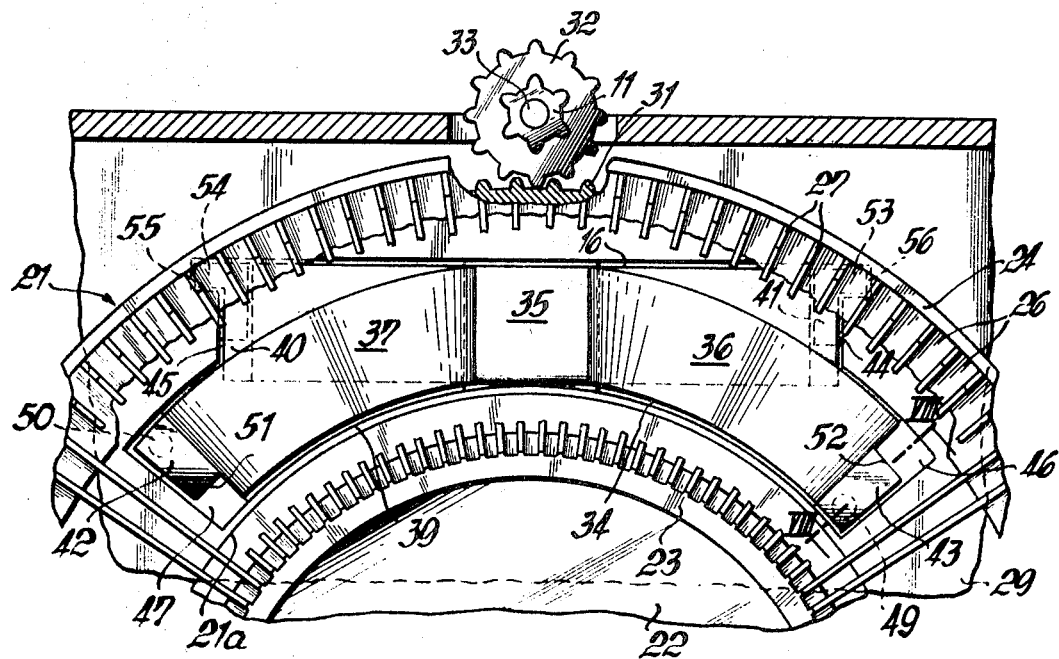
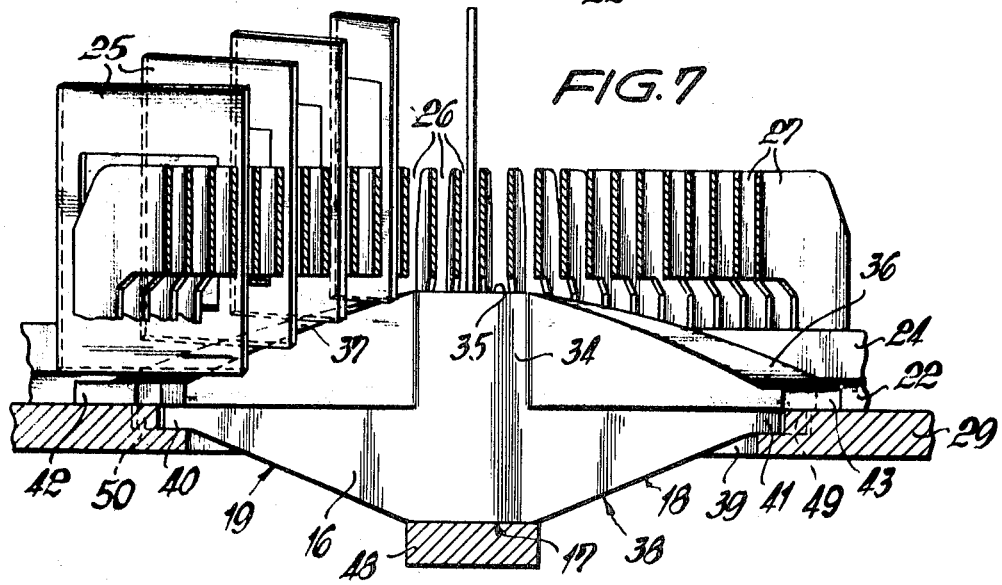

United States Patent Office
3,606,545
Patented Sept. 20, 1971

3,606,545
CONVERTIBLE SLIDE PROJECTOR
Rolf Heinzmann, Stuttgart-Bad Cannstatt, and Albert Stieringer, Calmbach, Germany, assignors to Robert Bosch Elektronic und Photokino GmbH, Stuttgart-Unterturkheim, Germany
Filed Sept. 5, 1968, Ser. No. 757,647
Claims priority, application Germany, Sept. 8, 1967, P 15 72 587.8
Int. Cl. G03b 23/04, 23/06
U.S. Cl. 353—117               10 Claims

ABSTRACT OF THE DISCLOSURE

A convertible slide projector which can operate with circular or straight slide trays has a lifting unit which is composed of two ramps each adapted to lift slides in one type of trays. The lifting unit can be inserted into the bottom wall of the projector housing in either one of two positions in each of which one of the ramps extends upwardly and into a channel provided in the bottom panel of the corresponding type of tray. A straight slide tray is formed with a straight channel and co-operates with a straight ramp which serves to lift those slides which reach the slide changing station to a level above a lateral ledge of the straight tray so that the slide changer can transport the thus raised slides to projection position and back into the respective compartments of the straight tray. The bottom panel of the circular tray is formed with a ring-shaped channel which receives an arcuate ramp.

CROSS-REFERENCE TO RELATED APPLICATION

The present slide projector constitutes an improvement over and a further development of the apparatus disclosed in co-pending application Ser. No. 764,123, filed July 19, 1968, by Helmut Rube for "Slide Projector for Use With Straight and Circular Slide Trays" and assigned to the same assignee.

BACKGROUND OF THE INVENTION

The present invention relates to slide projectors in general, and more particularly to slide projectors which can utilize several types of slide trays, especially circular and straight slide trays. Still more particularly, the invention relates to improvements in slide projectors for use with trays which are provided with relatively low side panels or ledges which prevent unintentional or accidental displacement of slides and over which the slides must travel during movement with the slide changer to and from projection position.

Slide trays which are provided with such ledges normally comprise bottom panels having elongated channels or cutouts for so-called lifting cams or ramps which are installed in the housing of the slide projector and serve to lift successive slides above the level of the ledge when the slides move into the range of the slide changer. Reference may be had, for example, to German Pat. No. 1,033,928. This patent discloses slide trays which are formed with a relatively wide centrally located channel. However, it is also known to provide the bottom panel of a slide tray with two channels each of which can accommodate a ramp and the distance between the ramps is then selected in such a way that the lower edge of the slide frame resting thereon is held in substantially horizontal position. The slide projector which is disclosed in the aforementioned German patent can be used with straight slide trays but not with circular trays. Thus, a person owning both types of trays must purchase two slide projectors which involves considerable initial investment and other inconveniences.

The aforementioned co-pending application of Rube discloses a versatile slide projector which can accept straight and circular slide trays. This projector employs a specially configurated ramp which can fit into the straight groove of a straight tray or into the circular groove of a circular tray.

SUMMARY OF THE INVENTION

One of the objects of our present invention is to provide a slide projector which can accept several types of trays and wherein the structure which lifts slides over the ledges of their trays is constructed, assembled and configured in a novel and improved way.

Another object of the invention is to provide a convertible slide projector which can accept conventional circular or straight slide trays.

A further object of the invention is to provide a novel assembly of ramps which can be utilized in the just outlined slide projector.

An additional object of the invention is to provide a convertible slide projector which is just as compact as a conventional slide projector for circular or straight slide trays.

The invention is embodied in a convertible slide projector for use with plural types of slide trays including a first type having a circular bottom panel provided with a ring-shaped channel and a second type having a straight bottom panel provided with a straight channel. The slide projector comprises a housing having a supporting portion arranged to movably support one slide tray at a time, and a plurality of interchangeable lifting cams each movable to an operative position with reference to the supporting portion of the housing to extend into the channel of a slide tray on the supporting portion. The lifting cams include a substantially straight first lifting cam arranged to extend into the channel of a straight tray and an arcuate lifting cam arranged to extend into the channel of a circular tray.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 3 is a fragmentary horizontal sectional view of the slide projector with a straight slide tray;

FIG. 4 is a fragmentary vertical sectional view of the structure shown in FIG. 3;

FIG. 5 is a fragmentary sectional view as seen in the direction of arrows from the line V—V of FIG. 3;

FIG. 6 is a fragmentary horizontal sectional view of the slide projector with the circular slide tray of FIG. 1;

FIG. 7 is a fragmentary vertical sectional view of the structure shown in FIG. 6; and FIG. 8 is a fragmentary sectional view as seen in the direction of arrows from the line VIII—VIII of FIG. 6.

DESCRIPTION OF THE PREFERRED EMBODIMENT

Figure 1:
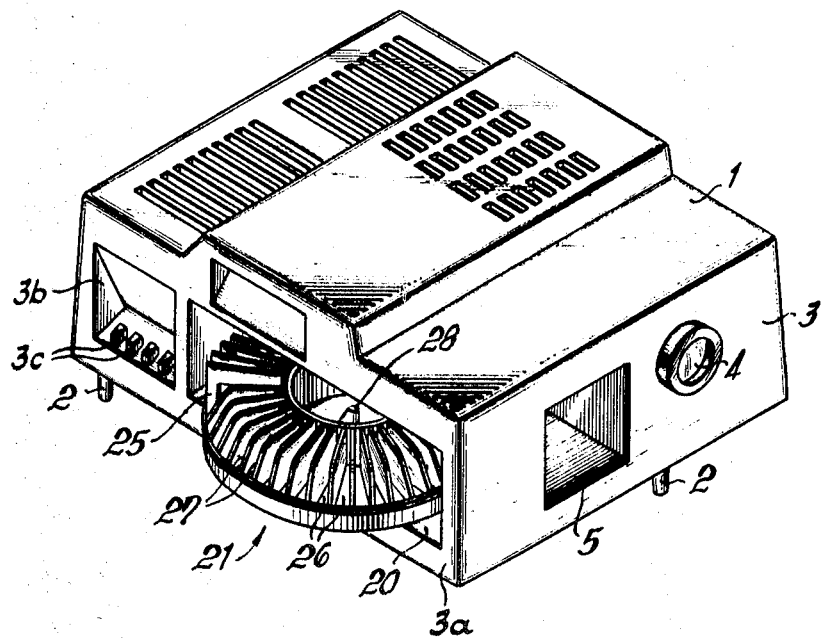
FIG. 1 is a perspective view of a convertible slide projector which embodies the invention and which is shown with a circular slide tray.

FIG. 1 illustrates the housing 1 of a slide projector. The housing 1 is provided with several legs 2 and includes a front wall 3 which carries a lens barrel 4. An elongated straight tunnel or passage 5 extends through the housing 1 in parallelism with the optical axis of the projection objective and serves to accommodate a straight slide tray 6 shown in FIGS. 3 and 4. The tray 6 is inserted through the rear end of the tunnel 5 and is advanced forwardly in stepwise fashion to place successive slides 14 (FIG. 4) into registry with the slide changer, not shown. The tray 6 preferably consists of synthetic plastic material and includes a straight bottom panel 7, a relatively high side panel 8 and a relatively low side panel or ledge 9. The panels 8, 9 are parallel to each other and flank the bottom panel 7. The panel 9 is provided with a line of openings 10 so that it forms a straight rack which meshes with a gear 11 forming part of a transporting mechanism for the tray 6. The slides 14 are accommodated in compartments 12 which are separated from each other by thin equidistant vertical partitions 13 extending at right angles to the planes of panels 7, 8 and 9. The aforementioned slide changer serves to move successive slides 14 from the respective compartments 12, to a projection position in which the slides extend across the optical axis of the objective to have their images projected onto a screen, and back into the corresponding compartment. The manner in which the slide changer operates is well known and forms no part of the present invention.

Figure 2:
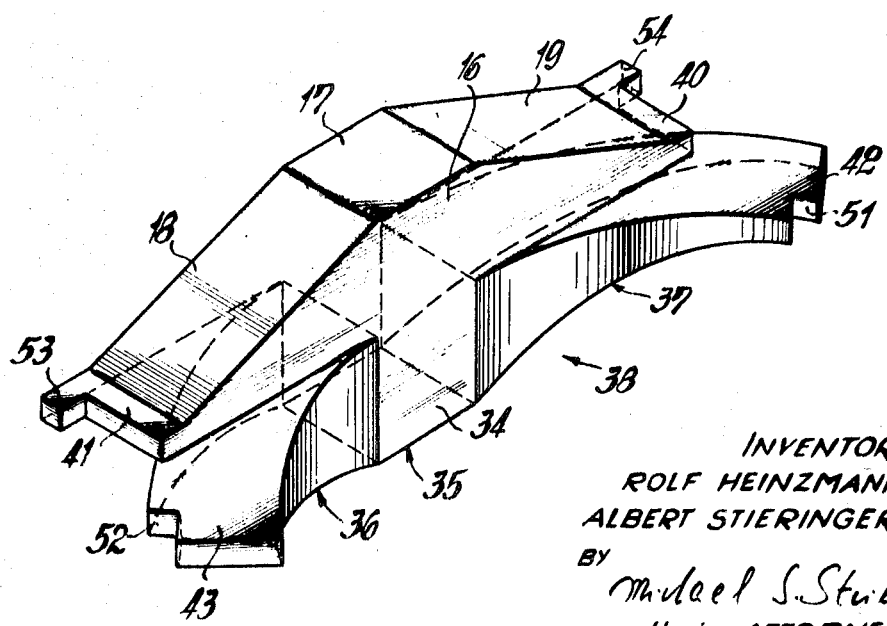
FIG. 2 is an enlarged perspective view of two lifting cams which can be utilized in the slide projector of FIG. 1.

The bottom panel 7 of the slide tray 6 is formed with an elongated channel or cutout 15 (FIG. 3) which also extends into the lower portions of partitions 13 and is parallel to the tunnel 5 when the latter accommodates the tray 6. This channel 15 serves to receive a first lifting cam or ramp 16 (best shown in FIG. 2). The ramp 16 has a flat horizontal top face 17 and two end faces 18, 19 which slope downwardly and flank the top face 17. The top face 17 supports the frame of at least that slide 14 which is in registry with the slide changer. When the ramp 16 is properly oriented and held in operative position shown in FIG. 4, its top face 17 is located at the level of or preferably at a level above the top edge face of the lower side panel 9 on the straight tray 6. This enables the slide changer to carry a slide which rests on the top face 17 to and from the projection position without any interference on the part of the panel 9. The end faces 18, 19 serve to guide the frames of slides 14 during travel onto and off the top face 17.

FIG. 1 shows that the right-hand side wall 3a of the housing 1 is formed with a pocket 20 of rectangular outline which communicates with the tunnel 5 and serves to permit insertion or withdrawal of a circular slide tray 21. The side wall 3a is further provided with a depression 3b which accommodates a row of control knobs 3c including a knob which starts the motor and turns on the projection lamp, a knob which starts the slide changer, a knob which starts the transporting mechanism for trays and/or others. When the circular tray 21 is properly inserted into the housing 1, a portion thereof extends into the tunnel 5 in a manner as shown in FIG. 6. The tray 21 is then indexible about a vertical axis. This tray comprises a circular bottom panel 22 (FIGS. 6 and 7), a relatively high cylindrical inner side panel 23 and a relatively low cylindrical outer side panel or ledge 24. The slides 25 are accommodated in compartments 26 which are separated from each other by thin partitions 27. These partitions extend radially of the axis of the tray 21 in the space between the inner and outer side panels 23, 24. The bottom panel 22 has a centrally located opening (not shown) which accommodates a positioning projection 28 (FIG. 1) of the housing 1 when the tray 21 is properly inserted into the pocket 20 and tunnel 5. The bottom panel 22 then rests on a supporting portion or bottom wall 29 of the housing 1.

The bottom wall 29 closes the lower ends of the tunnel 5 and pocket 20 and carries the aforementioned positioning projection 28. The underside of the bottom panel 22 on the circular tray 21 is formed with a ring gear 31 (FIG. 6) which meshes with an indexing gear 32. The latter is coaxial with the gear 11 for the straight tray 6. A drive shaft 33 is rotated by a motor when the slide projector is in use to drive the gears 11 and 32. As shown in FIG. 6, the bottom panel 22 of the tray 21 is formed with a concentric annular channel or cutout 21a whose width is the same as that of the channel 15 in the bottom wall 7 of the tray 6. The channel 21a extends into the lower portions of partitions 27 and serves to receive a second lifting cam or ramp 34. The distance between the channel 21a and the outer side panel 24 of the tray 21 is the same as that between the channel 15 and side panel 9. FIGS. 6 and 7 illustrate the ramp 34 in operative position; this ramp also comprises a flat horizontal top face 35 and two end faces 36, 37 which slope downwardly and flank the top face 35. A slide 25 whose frame rests on the central portion of the top face 35 is in the range of the slide changer and is ready to be transported to projection position. When the ramp 34 is placed into the operative position of FIG. 6 or 7, the top face 35 is located at the level of but preferably at least slightly above the top edge of the outer side panel 24 so that the slides 25 can be readily moved sideways over the panel 24 toward and away from projection position.

In accordance with a feature of the present invention, the ramps 16, 34 are interchangeable, i.e., one thereof can be placed into operative position when the other is moved away from operative position and vice versa. These ramps may constitute two separate entities. However, and in order to reduce the likelihood of misplacing one of the ramps 16, 34 when the other ramp is in use, we prefer to assemble such ramps into a single lifting unit 38 best shown in FIG. 2, 4 and 7. In order to conceal one of the ramps when the other ramp is held in operative position, the bottom wall 29 of the housing 1 is formed with a recess or opening 39 whose configuration corresponds to that of the lifting unit 38. This recess 39 is formed in that portion of the bottom wall 29 which is adjacent to the bottom portion of the tunnel 5 in the region where the tunnel communicates with the pocket 20. In FIGS. 3 and 4, the ramp 16 is held in operative position and the ramp 34 is concealed in the recess 39. FIGS. 6 and 7 illustrate the ramp 34 in operative position, i.e., the ramp 16 is accommodated in the recess 39. That ramp which is in operative position extends into the tunnel 5.

The bottom wall 29 and the ramps 16, 34 are provided with suitable locating means which insure satisfactory retention of the lifting unit 38 in either one of its two positions, i.e., with the ramp 16 extending into the tunnel 5 and with the ramp 34 extending into the recess 39 or vice versa. Such locating means include flat extensions 40, 41 and 42, 43 which are respectively provided at the longitudinal ends of the ramps 16, 34 and matching sockets 44, 45 and 46, 47 provided therefor in the bottom wall 29. It is preferred to provide the housing 1 with a further supporting member 48 which resembles a traverse and extends across the recess 39 at a level below the bottom wall 29 to support the top face 17 or 35, i.e., the top face of that ramp which is held in inoperative position. The traverse 48 is best shown in FIGS. 4 and 7.

In FIGS. 3 and 4, the straight slide tray 6 is inserted into the tunnel 5 and the channel 15 of its bottom wall accommodates the ramp 16. The top face 35 of the ramp 34 rests on the traverse 48. The extensions 42, 43 of the idle ramp 34 are received in the corresponding sockets 46, 47 but the extensions 40, 41 of the ramp 16 are not accommodated in the sockets 44, 45. FIG. 5 illustrates the extension 42 which is accommodated in the socket 46 of the bottom wall 29. The sockets 46, 47 respectively accommodate upwardly extending projections or stubs 49, 50 of the bottom wall 29. These stubs extend into notches 51, 52 provided in the extensions 42, 43 (see FIGS. 2 and 3). The stubs 49, 50 do not prevent the extensions 42, 43 from coming to rest on the bottom surfaces in the sockets 46, 47 when the ramp 16 assumes the operative position of FIG. 3.

When the tray 6 is removed from the tunnel 5 and is to be replaced by the tray 21, the lifting unit 38 must be inverted so that the ramp 34 assumes the operative position shown in FIGS. 6 and 7. The ramp 16 then extends into the recess 39 and its top face 17 rests on the traverse 48. The extensions 40, 41 of the ramp 16 are received in the sockets 44, 45 of the bottom wall 29. The extensions 42, 43 of the ramp 34 (in operative position) rest on the stubs 49, 50. The top faces of the stubs 49, 50 are flush with the top surface of the bottom wall 29. In order to prevent uncontrolled displacements of the lifting unit 38 in operative position of the ramp 34, the extensions 40, 41 of the ramp 16 are formed with projections or fingers 53, 54 which then extend into matching notches 55, 56 of the bottom wall 29.

The improved slide projector is susceptible of mnay modifications without departing from the spirit of our invention. As stated before, the lifting unit 38 can be replaced by two discrete ramps 16, 34. It is also possible to mount the lifting unit 38 or the individual ramps 16, 34 in the housing 1 for pivotal movement to and from operative positions. For example, the lifting unit 38 could be mounted on the bottom wall 29 for pivotal movement about a horizontal axis so as to place the ramp 16 into operative position in response to rotation through 180 degrees and the ramp 34 into operative position in response to rotation through another 180 degrees. The lifting unit 38 or the ramps 16, 34 can be pivoted by hand or in automatic response to insertion of the corresponding type of tray.

An important advantage of the lifting unit 38 or of two interchangeable ramps 16, 34 is that each ramp can be designed with a view to readily fit into the channels of conventional slide trays and to properly lift that slide which is about to be transported to projection position. The lifting unit 38 or the individual ramps may be made of metallic or synthetic plastic material or of a combination of two or more different materials. It will be noted that a central plane of the unit 38 extends between the cams 16 and 34.

What is claimed as new and desired to be protected by Letters Patent is set forth in the appended claims:

1. In a convertible slide projector for use with plural types of slide trays including a first type having a circular bottom panel provided with a ring-shaped channel and a second type having a straight bottom panel provided with a straight channel, a combination comprising a housing having a supporting portion arranged to movably support one slide tray at a time; and a plurality of interchangeable lifting cams each movable to an operative position with reference to said supporting portion to extend into the channel of a slide tray on said supporting portion, said lifting cams including a substantially straight first lifting cam arranged to extend into the channel of a straight tray and an arcuate second lifting cam arranged to extend into the channel of a circular tray, said first and second cams being rigidly connected to each other to form a lifting unit which must be inverted in order to move one of the cams to operative position by simultaneously moving the other cam from operative position.

2. In a convertible slide projector for use with plural types of slide trays including a first type having a circular bottom panel provided with a ring-shaped channel and a second type having a straight bottom panel provided with a straight channel, a combination comprising a housing having a supporting portion arranged to movably support one slide tray at a time; and a lifting unit including two slide lifting cam portions one of which is intended to extend into the channel of a circular slide tray on said supporting portion and the other of which is intended to extend into the channel of a straight slide tray on said supporting portion, said lifting unit being adapted to be placed into said housing in different positions for use with either a circular or a straight slide tray.

3. A combination as defined in claim 2, wherein each of said lifting portions comprises a substantially flat top face and a pair of end faces sloping downwardly from and flanking said top face.

4. A combination as defined in claim 2, wherein said supporting portion is arranged to support the bottom panels of slide trays in substantially horizontal positions.

5. A combination as defined in claim 2, wherein said slide projector is used with slide trays of the type having relatively low first and relatively high second side panels flanking the respective bottom panels and wherein said lifting portions in the respective positions of said unit extend at least to the level of the respective first side panels.

6. A combination as defined in claim 1, wherein said cams extend from the opposite sides of a central plane of said lifting unit.

7. A combination as defined in claim 1, wherein said supporting portion has a recess which accommodates one of said cams in the operative position of the other cam and vice versa.

8. A combination as defined in claim 7, wherein said supporting portion constitutes the bottom wall of said housing.

9. A combination as defined in claim 7, further comprising means for locating said lifting unit with reference to said supporting portion in such orientation that one of said cams automatically assumes said operative position when the other cam is properly accommodated in said recess and vice versa.

10. A combination as defined in claim 9, wherein said locating means comprises projections provided on said cams and complementary sockets provided in said recess.

References Cited
UNITED STATES PATENTS

| | | | |
|---|---|---|---|
| 3,160,059 | 12/1964 | Weiss | 353—115 |
| 3,233,511 | 2/1966 | Deeg | 40—79X |
| 3,409,353 | 11/1968 | Zillmer | 353—117 |
| Re. 26,619 | 7/1969 | Hall | 353—117 |

LEONARD FORMAN, Primary Examiner

A. J. MIRABITO, Assistant Examiner